R. DIESEL.
AIR COMPRESSING AND STORAGE APPARATUS.
APPLICATION FILED FEB. 20, 1911.
1,066,261.  Patented July 1, 1913.
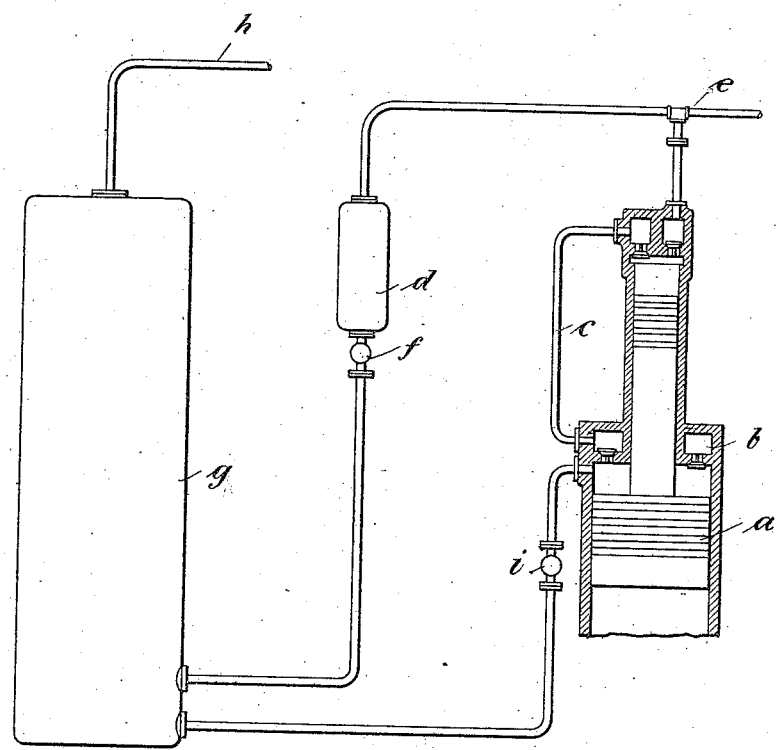
Witnesses:
Max W. A. Doring.
George Buck
Rudolf Diesel
Inventor
By his Attorney
H. E. Kimball

UNITED STATES PATENT OFFICE.

RUDOLF DIESEL, OF MUNICH, GERMANY, ASSIGNOR TO BUSCH-SULZER BROS. DIESEL ENGINE COMPANY, OF ST. LOUIS, MISSOURI, A CORPORATION OF MISSOURI.

AIR COMPRESSING AND STORAGE APPARATUS.

1,066,261. Specification of Letters Patent. Patented July 1, 1913.

Application filed February 20, 1911. Serial No. 609,568.

*To all whom it may concern:*

Be it known that I, RUDOLF DIESEL, a subject of the King of Bavaria, residing at 32 Maria-Theresiastrasse, Munich, in the Kingdom of Bavaria, Germany, engineer, have invented certain new and useful Improvements Relating to Air Compressing and Storage Apparatus, of which the following is a specification.

Lately there have been used in connection with internal combustion engines, more especially those for driving ships or motor vehicles, air pumps which are driven from the vehicle motor or an auxiliary motor for the purpose of compressing air for various secondary uses. According to the use for which it is designed, compressed air at various pressures is required; for example, very heavy oils can be used as combustible for the engine by spraying them by means of compressed air, whereof the pressure must be very high. For the purpose of starting by compressed air or for inflating tires or operating brakes, however, such high pressures are not required, and still lower pressures are needed for keeping the lubricant or fuel under pressure in its reservoir. Now the driver, while driving, cannot be expected to pay attention to the filling of the various air reservoirs and to the maintenance of the correct pressure in each, for this would necessitate continuous observation of manometers, adjustment of valves, connection and disconnection of the air pumps and the like.

The present invention relates to a method by which compressed air is automatically stored in several vessels at any desired degree of pressure. An arrangement of apparatus for carrying out the method is shown in the accompanying diagrammatic drawing. Therein $a$ is the air pump which is driven in any manner from the driving motor or auxiliary motor of the vehicle; in the example shown this pump is a two-stage compressor. The air is drawn in at $b$ and passed through $c$ from the first to the second stage and finally led to the vessel $d$ in which the highest pressure prevails. This vessel is connected through pipe $e$ with that auxiliary work which requires this highest pressure; the portion of air which is not used for this purpose passes through an adjustable overflow valve $f$ of any known construction into vessel $g$, in which the air is at any other lower pressure and more or less of it flows to the place where it is to be used through pipe $h$. What is not used here returns through a further adjustable overflow valve $i$ to the air pump.

It is quite immaterial whether at $e$ and $h$, much, little, or no air is used; the pump can run continuously, since the air flowing back through $i$ prevents in known manner the intake of the same amount of fresh air through $b$, so that the circulation of air continues automatically, without the attention of the driver of the vehicle.

The invention can also be applied to stationary motors using compressed air as an aid for various purposes.

Having thus described the nature of the said invention and the best means I know of carrying the same into practical effect, I claim:—

1. Air compressing and storage apparatus comprising an air pump, a plurality of air reservoirs connected in series and supplied by the pump, the first being provided with an overflow to the second and so on, and each overflow having suitable valve means to determine successively lower pressures in each reservoir in the series, in combination with a return connection from the reservoir of lowest pressure to the suction space of the said air pump.

2. Air compressing and storage apparatus comprising a multi-stage air pump, a plurality of successively connected air reservoirs connected in series relation to the highest stage of the pump, and an overflow valve in each connection between reservoirs adapted to determine successively lower pressures therein in combination with a return connection from the reservoir of lowest pressure to the suction space of the lowest stage of the air pump and an overflow valve in such connection for determining the pressure in said last named reservoir.

3. Air compressing and storage apparatus comprising a multi-stage air pump, a series of reservoirs supplied thereby, a valve device for venting one of such reservoirs of excess of air, and a return connection from such device to the intake port of the lowest stage of the aforesaid air pump.

In testimony whereof I have signed my name to this specification in the presence of two subscribing witnesses.

RUDOLF DIESEL.

Witnesses:
A. VEREW COXER,
MATHILDE K. HELD.

Copies of this patent may be obtained for five cents each, by addressing the "Commissioner of Patents, Washington, D. C."